United States Patent Office 3,117,941
Patented Jan. 14, 1964

3,117,941
PROCESS FOR THE PRODUCTION OF EXPANDABLE GRANULAR RESINS FROM THERMOPLASTIC SYNTHETIC FILM-FORMING RESINS
Horst Erich Knobloch, Ludwigshafen (Rhine), Ferdinand Meyer, Ziegelhausen (Neckar), and Fritz Stastny, Ludwigshafen (Rhine), Germany, assignors to Badische Anilin- & Soda-Fabrik Aktiengesellschaft, Ludwigshafen (Rhine), Germany
No Drawing. Filed Oct. 12, 1959, Ser. No. 845,616
Claims priority, application Germany Oct. 15, 1958
7 Claims. (Cl. 260—2.5)

This invention relates to a process for the production of expandable granular materials from thermoplastic synthetic substances.

Processes are already known for preparing expandable granular materials from thermoplastic substances. Such expandable granular materials have great technical interest because expanded articles of any desired shape can be prepared therefrom in a simple way by heating and sintering in molds which are not gastight. For example expandable granular materials are obtained when an aqueous suspension of polymerizable unsaturated compounds is polymerized in the presence of suspension stabilizers, such as gelatins, polyacrylamide of barium sulfate, and in the presence of expanding agents for the thermoplastic substance. This method cannot be used however in the case of thermoplastic substances which are to be subsequently changed by chemical reaction, for example when it is desired to prepare an expandable chlorpolystyrene by chlorination of polystyrene, because the material containing the expanding agent loses its expandability during this reaction. Hereinafter thermoplastic synthetic substances are sometimes shortly called plastics.

It is also known to work expanding agents into plastics by mechanical means, for example by mixing the plastic with the expanding agent in screw presses. In carrying out this process industrially, however, it is difficult to prevent the plasticised plastic with the expanding agent contained therein from expanding when it is forced out in rod form for subsequent granulation.

We have now found that expandable granular materials with a grain size between 0.2 and 4 mm. can be prepared in a simple way from synthetic thermoplastic substances by intermingling with one other (a) water containing a dispersing agent for organic liquids which are immiscible with water, and (b) a solution of a thermoplastic substance in a low boiling organic solvent which forms with water two separate phases and which contains dissolved therein a small amount of a water-insoluble expanding agent for the thermoplastic substance, while keeping the resulting mixture in steady motion, removing the solvent from the mixture while continuing the steady movement and separating from the aqueous phase the expandable granular material formed from the thermoplastic substance.

The process according to this invention is preferably carried out by dissolving a synthetic thermoplastic substance and a small amount of an expanding agent for the thermoplastic substance in a low-boiling solvent which is immiscible with water and pouring this solution smoothly, with simultaneous not too vigorous stirring, into an aqueous solution of a dispersing agent. In principle it is also possible to proceed conversely, i.e. to add the aqueous solution of the dispersing agent to the solution of the plastic while stirring. This method of operation is unsuitable however when the volume of the aqueous phase is considerably greater than that of organic phase, i.e. the plastic solution. The solvent for the plastic is then removed with further stirring from the mixture of the aqueous and organic phases. The removal of the solvent may be commenced during the mixing of the two phases. The solvent may be removed for example by leading an inert gas, such as nitrogen or carbon dioxide, through the mixture or by distilling it off under reduced pressure. During the mixing of the two phases, the plastic solution is dispersed in the form of droplets in the aqueous phase by reason of the uniform, not too vigorous movement of the liquids. The dispersing agent prevents the droplets from running together during the removal of the solvent. In this way the plastic is obtained in bead form and at the same time a homogeneous distribution of the expanding agent in the plastic is achieved. The expandable granular material can then readily be separated from the aqueous phase by filtration or centrifuging. By heating the beads to temperatures above the softening point of the plastic in question and above the temperature at which the expanding agent acts the granular material is foamed up to form a porous material of low specific gravity. If the heating is carried out in molds which are closed in a non-gastight manner, the expandable granules cohere by sintering and porous shaped articles can be formed.

As synthetic thermoplastic substances there are suitable thermoplastic film-forming polyvinyl compounds, for example polymers of styrene, acrylic acid esters, methacrylic acid esters, vinyl chloride, vinylidene chloride, vinyl carbazole or copolymers of two or more of these compounds. Thermoplastic film-forming polycondensation products are also suitable, for example linear polyesters or polyamides, which in some cases may also be slightly crosslinked. Expandable granular materials can also be made with advantage according to this process from chlorpolystyrene which in turn is obtained by chlorination of polystyrene. Since the chlorination takes place by leading chlorine into a solution of polystyrene, there is available, after removing the hydrogen chloride and adding an expanding agent, a solution of the chlorpolystyrene which can be further worked up at once to a granular expandable material. By expanding this granular material of chlorpolystyrene in closed molds, non-inflammable porous shaped articles are obtained.

The plastics used are dissolved in a low-boiling organic solvent which forms with water two separate phases. It is chiefly liquids with boiling points between 30 and 90° C. which are to be regarded as low-boiling. There are preferably used organic solvents which are immiscible or at the most only slightly miscible with water. The organic solvent should be able to dissolve synthetic thermoplastic substances at the working temperature. Suitable examples of these are above all chlorinated hydrocarbons, such as methylene chloride, ethylene chloride, carbon tetrachloride or 1,1,2-trichlorethane. Other suitable solvents are benzene, ethyl acetate, diisopropyl ether or tetrahydrofurane or mixtures of these. As a rule the solutions of the plastics are prepared in strengths of 5 to 50%. The average particle size of the granular materials obtained according to this invention varies not only according to the speed of the stirring and the nature and amount of the dispersing agent, but also according to the concentration and viscosity of the plastic solution. If the stirring speed and concentration of dispersing agent remain constant, larger particles are obtained when the viscosity of the solution is higher. The viscosity of the plastic solution may conveniently be between about 1000 and 5000 centipoises. This viscosity range is especially suitable for the production of granular materials with particle sizes between 0.2 and 4 mm., sizes which are interesting industrially for the production of porous shaped articles.

In the plastic solution there is also dissolved a small amount of a water-insoluble expanding agent for the plastic. The expression "insoluble" is not to be understood literally, as it is well-known in the art that there are no compounds which are absolutely insoluble in water. Eminently suitable expanding agents are readily volatile organic liquids which do not dissolve the plastic in question at the working temperature or at the most only cause it to swell slightly. For polystyrene or chlorpolystyrene there are suitable for example petroleum ether with the boiling range 40° to 60° C., pentane, hexane, heptane or cyclohexane. Other liquid expanding agents, depending on the solubility properties of the plastics in question, are for example cyclopentane, diethyl ether or carbon tetrachloride. The liquid expanding agents are as a rule used in amounts of 2 to 20% by weight, preferably 5 to 10% by weight, with reference to the weight of plastic present in the organic phase dispersed with water.

The affinity of such readily volatile liquid expanding agents for high molecular plastics is often surprisingly great so that low-boiling solvents may be completely removed from the mixture without the liquid expanding agent being volatilized therewith. In some cases it is even possible to use as expanding agents for the plastics non-solvent liquids of which the boiling point is a little lower than the boiling point of the solvent used. The solvents themselves are unsuitable as expanding agents because expanded articles prepared with their aid have only low mechanical strength. The solvent should therefore be removed as completely as possible from the expandable material.

As expanding agents there are also suitable solid substances which decompose when heated and split off gas, for example azoisobutyronitrile, diazoaminobenzene or benzenesulfonic acid hydrazide. Such solid expanding agents are as a rule added in amounts of 5 to 40% by weight with reference to the plastic.

Agents for dispersing in water organic liquids which are immiscible with water are known in large numbers. They are often also referred to as emulsifying agents, wetting agents, suspension stabilizers or protective colloids. For this purpose there are suitable water-soluble high-molecular-weight substances, which may be ionic or non-ionic such as gelatins, casein, polyvinyl alcohol, polyacrylic acid or salts of polyacrylic acid; also finely divided solid substances, such as kaolin, talc, precipitated magnesium hydroxide or barium sulfate. Polyvinylpyrrolidone is especially suitable. The usual emulsifying agents may also be successfully used, such as alkali salts of alkylnaphthalenesulfonic acids or of long-chain aliphatic carboxylic acids or alkylsulfonic acids. The concentration of the dispersing agent is preferably between 0.05 and 0.5% by weight in the aqueous phase. Concentrations of dispersing agent higher than 0.5% promote a fine dispersion of the plastic. The particles finally obtained have a diameter of for the most part less than 0.2 mm. and are of no industrial interest for the production of expanded articles. With concentrations of dispersing agent of less than 0.05%, on the other hand, it is difficult to achieve a dispersion of the plastic solution or, rather, it is difficult to prevent the dispersed plastic solution from running together again. The amount which it is advantageous to use may naturally be somewhat different in each case according to the dispersing action of the agent used.

Not only the nature and amount of the dispersing agent, but also the manner in which the mixture is moved is of special importance for the dispersion of the plastic solution to form globules of uniform size. Good results are achieved when the plastic solution is allowed to flow smoothly into the aqueous phase which contains the dispersing agent while stirring uniformly but not too strongly. Stirring speeds of 100 to 250 r.p.m. have been found to be suitable, and the particular shape of the stirrer is also determinative. It is advantageous to use a blade stirrer which sets the whole mass of the mixture into a non-turbulent circular motion. Very high stirring speeds disperse the plastic solution in ever smaller droplets so that when moving the mixture in a powerful and turbulent manner and when using large amounts of emulsifying agent it is possible in some cases to pass into the colloidal order of magnitude. The mixture can be kept in a uniform, not too strong movement not only by stirring but also by means of a steady gas current which simultaneously removes the solvent; or the solution of dispersing agent may be allowed to flow out from a funnel-shaped container so that it automatically acquires a uniform circular motion and then allowed to flow thus into the plastic solution. The process of the present invention may also be carried out continuously by leading the aqueous phase in circulation through a series of vessels in which, consecutively, the mixture is prepared, the solvent is expelled and the granular material is separated.

When working discontinuously in the production of granular materials with uniform grain size according to this invention, care must also be given to the liquor ratio, i.e. the ratio of the volume of the aqueous phase of dispersing agent to the volume of the plastic solution as the organic phase. It is advantageous to work with a liquor ratio of 10; 1 to about 1:1. A larger liquor ratio than 10:1 is in general uneconomical. With ratios smaller than 1:2 it is scarcely possible to achieve dispersion of the plastic solution.

Besides the expanding agent, other additives may be added to the plastic solution, as for example fillers, pigments, dyestuffs, softeners, flame-preventing additions or insecticides. In this way, expandable granular materials are obtained which contain the said additives in finely divided form.

The solvent for the plastic is removed from the mixture during the mixing of the two phases or following the mixing and value is placed on the most complete removal possible. Since these solvents are of low boiling point, i.e. readily volatile liquids, it is sufficient in general if an inert gas, such as nitrogen or carbon dioxide, is led through the mixture for about 3 to 5 hours. If necessary, the solution may be heated slightly. Most plastic solutions are sufficiently insensitive to air so that this may also be used for removal of the solvent. After the removal of the solvent, solid granular materials are obtained which can be easily separated from the aqueous phase by filtration or centrifuging.

The granular materials prepared according to the process of this invention contain an expanding agent in uniform dispersion and may therefore be expanded to porous masses having closed cells. By having due regard to the various process conditions—state of movement of the mixture, concentration of the dispersing agent, viscosity of the plastic solution and in some cases liquor ratio—there are obtained granular materials with a uniform grain size between 0.2 and 4 mm. These have great industrial importance for the production of expanded articles by heating in non-gastight molds. Above all, it is possible by this process to prepare in a simple way chlorpolystyrene granular materials which contain an expanding agent. These are important in the production of incombustible expanded articles.

The following examples will further illustrate this invention but the invention is not restricted to these examples. The parts specified are parts by weight.

*Example 1*

1600 parts of a 0.1% solution of polyvinylpyrrolidone in water are placed in a cylindrical vessel. The aqueous solution is steadily moved by means of a blade stirrer which rotates at 150 to 170 r.p.m. 400 parts of a solution of chlorpolystyrene in methylene chloride having about 42% of solids content is poured smoothly into the aqueous solution. In the chlorpolystyrene solution there are also present 10 parts of normal hexane. The solution of chlorpolystyrene is obtained by chlorination of polystyrene as follows:

75 parts of polystyrene are dissolved in 280 parts of methylene chloride. Into the cooled solution, 50 parts of chlorine are led during 10 hours while stirring. The hydrogen chloride formed is expelled by a current of nitrogen. The solution is then adjusted to pH 8 by means of dry ammonia. The viscosity of the solution is 1400 centipoises.

While the chlorpolystyrene solution is being poured in it disperses in the form of globules of substantially uniform particle size. About 1 to 2 minutes is required for the dispersion. Then a current of nitrogen is led through the solution for about 4 hours, the solvent being thereby removed almost completely. It is again stirred steadily. A granular material of substantially uniform particle size is formed which is filtered off from the aqueous phase, washed with water and dried for 15 hours in the air. 80% of the particles have a diameter between 1 and 2 mm. Only 8% have a diameter greater than 2 mm. and 12% a diameter less than 1 mm. but not less than 0.2 mm.

If this granular material is kept in boiling water for 5 to 10 minutes, it expands to fine-pored balls with a bulk density of 20 to 40 grams per litre. The pre-expanded balls can be further expanded by heating to about 115° C. in molds which are closed in a non-gastight manner, and they then cohere to form porous non-inflammable shaped articles with a bulk density of about 0.03.

*Example 2*

1600 parts of a 0.1% solution of polyvinylpyrrolidone in water are stirred in a cylindrical vessel with a blade stirrer operating at a speed of 200 to 220 r.p.m. 400 parts of a chlorpolystyrene solution in methylene chloride with a solid content of about 46% are poured into the aqueous solution of dispersing agent. The chlorpolystyrene solution is prepared in a manner similar to that described in Example 1. It also contains 10 parts of cyclohexane and 5 parts of glycol diglycidyl ether as stabilizer. Its viscosity is about 4000 centipoises. The plastic solution is dispersed to globules of uniform size. After separating the methylene chloride with the aid of a current of nitrogen during the course of 4 hours, filtering off and drying in the air, there is obtained a granular material consisting for the most part of globules having a diameter of 1.5 to 2 mm. The granular material may be expanded to form non-combustible porous shaped articles having a bulk density of 0.04.

When the blade stirrer is operated at 150 to 170 r.p.m., beads are obtained having for the most part diameter of 2 to 3 mm.

*Example 3*

1280 parts of a 15% solution in methylene chloride of a copolymer derived from styrene and acrylonitrile, which also contains 11 parts of pentane, are poured into 5000 parts of a 0.1% aqueous solution of polyvinylpyrrolidone, the mixture being stirred by means of a blade stirrer operating at 180 to 190 r.p.m. The viscosity of the polystyrene solution is about 2000 centipoises. After 1 to 2 minutes the plastic solution has been dispersed in the form of small globules in the aqueous phase. Nitrogen is led through the mixture for 4 hours and the methylene chloride thereby removed. After filtering off and drying, a granular material is obtained of which the beads have for the most part a diameter of 1.5 to 2 mm. and which can be expanded in molds which are closed in a non-gastight manner to form expanded articles of low specific gravity.

*Example 4*

330 parts of 20% solution of polystyrene ($k$-value 70) in methylene chloride, which contains 4 parts of petroleum ether (boiling point 33° to 40° C.) are poured while stirring into 2000 parts of an aqueous solution which contains 2 parts of a sodium salt of a long-chain alkyl sulfonate. The speed of stirring is 180 to 190 r.p.m. After expelling the solvent, expandable beads are obtained which for the most part have a diameter of 2 to 3 mm.

*Example 5*

1 part of azo-isobutylronitrile is dissolved in 35 parts of a 20% solution of polystyrene ($k$-value 70) in ethylene chloride. While stirring, the solution is poured into 100 parts of 0.1% aqueous solution of polyvinylpyrrolidone. The mixture is heated to about 40° to 50° C. and nitrogen is led through the mixture for 5 hours while continuing the stirring. Beads are obtained which are filtered off and dried in the air. They may be expanded in a mold having perforated walls at temperatures between 120° and 150° C. to expanded articles having a bulk density of 0.05 to 0.08.

*Example 6*

5 parts of normal hexane are dissolved in 300 parts of a 20% solution of a polycarbonate produced from butanediol-(1.4), 2.2-di-(para-hydroxyphenyl)-propane and phosgene in methylene chloride. The solution is introduced into 2000 parts of a 6.5% suspension of barium sulfate in water while stirring. To remove the methylene chloride, nitrogen is led through the mixture for 4 hours while continuing the stirring. A granular material is obtained which may be expanded to porous articles of low bulk density.

*Example 7*

300 parts of a 20% solution of polyvinylcarbazole in methylene chloride which also contains 6 parts of normal hexane are poured into 1000 parts of a 0.1% solution of polyvinylpyrrolidone in water while stirring. The solvent is expelled by means of nitrogen and beads are obtained which can be expanded by heating in molds to porous articles of the specific gravity 0.1.

*Example 8*

5 parts of a 20% aqueous solution of a copolymer derived from 4 parts of vinyl pyrrolidone and 1 part of methyl acrylate are added to 200 parts of water. Into the aqueous solution there is then poured smoothly a mixture of 200 parts of a 30% methylene chloride solution of chlorinated polystyrene (chlorine content 20%, $k$-value 55) and 5 parts of hexane while stirring with a blade stirrer operated at 190 r.p.m. While continuing the stirring, the solvent is distilled off from the suspension under reduced pressure. During the course of 3 hours the pressure is reduced from 380 mm./Hg to 60 mm./Hg and the temperature of the mixture raised from 20° C. to 40° C. 95% of the solvent introduced is recovered. Solid beads of subsequently-chlorinated polystyrene containing hexane are obtained having a diameter of 0.5 to 4 mm. By heating in boiling water they expand into an elastic fine-pored product with a bulk density of 20 g./l. When heated with steam in molds, this product coheres to form elastic difficultly-inflammable expanded articles.

We claim:
1. A process for the production of expandable granular materials from synthetic film-forming thermoplastic substances which comprises intermingling (*a*) water containing a small amount of a dispersing agent for organic liquids which are immiscible with water with (*b*) a 5 to 50% solution of a synthetic thermoplastic film-forming substance in an organic solvent which is water immiscible and has a boiling point between 30° and 90° C. and which solution also contains dissolved therein 2 to 40% by weight with reference to the organic solvent of a water-insoluble expanding agent, keeping the intermingled liquids (*a*) and (*b*) in steady motion to form small droplets of said organic solution in said water, removing the organic solvent from the mixture while continuing this steady movement, and separating the resultant expandable thermoplastic granular material with a grain size of 0.2 to 4 millimeters from the aqueous phase.

2. A process for the production of expandable granular material from synthetic thermoplastic film-forming substances which comprises adding a 5 to 50% solution of said thermoplastic substance in an organic water-immiscible solvent having a boiling point between 30° and 90° C., said solution also containing 2 to 20% of a volatile liquid organic water-insoluble expanding agent which does not dissolve the thermoplastic material, to water containing 0.05 to 0.5% of a dispersing agent for said organic, water-immiscible solvent, stirring the intermingled aqueous and organic phase to form small droplets of said organic solution in said water, removing the organic solvent while continuing the steady stirring, and separating the resultant expandable thermoplastic granular material with a grain size of 0.2 to 4 millimeters from the aqueous phase.

3. A process for the production of expandable granular materials from synthetic thermoplastic film-forming substances which comprises adding a 5 to 50% solution of said thermoplastic substance in an organic, water-immiscible solvent having a boiling point between 30° and 90° C., said solvent also containing 2 to 20% of a volatile liquid organic water-immiscible expanding agent which does not dissolve the thermoplastic material, to water containing 0.05 to 0.5% of a dispersing agent for said organic water-immiscible solvent, keeping the intermingled aqueous and organic phase in steady movement to form small droplets of said organic solution in said water and passing gas through the mixture thereby removing the organic solvent, and separating the resultant expandable thermoplastic granular material with a main grain size of 0.2 to 4 millimeters from the aqueous phase.

4. A process as claimed in claim 1 wherein polyvinyl pyrrolidone is used as the dispersing agent.

5. A process as claimed in claim 1 wherein polystyrene is used as the synthetic thermoplastic film-forming substance.

6. A process as claimed in claim 1 wherein chlorpolystyrene is used as the synthetic thermoplastic film-forming substance.

7. A process as claimed in claim 1 wherein the organic solvent is removed by distillation under reduced pressure.

References Cited in the file of this patent
UNITED STATES PATENTS

| | | |
|---|---|---|
| 2,744,291 | Stastny et al. | May 8, 1956 |
| 3,018,257 | Spencer | Jan. 23, 1962 |